United States Patent [19]
Mattinson et al.

[11] Patent Number: 6,113,957
[45] Date of Patent: Sep. 5, 2000

[54] PROCESS OF COLORING FRENCH FRY POTATOES

[75] Inventors: Bret Mattinson; Elizabeth Jensen, both of Othello, Wash.

[73] Assignee: McCain Foods USA, Oak Brook, Ill.

[21] Appl. No.: 09/274,262

[22] Filed: Mar. 22, 1999

Related U.S. Application Data

[60] Provisional application No. 60/079,339, Mar. 25, 1998.
[51] Int. Cl.⁷ .............................. A23L 1/216; A23L 1/217
[52] U.S. Cl. ..................... 426/250; 426/262; 426/438; 426/441; 426/637
[58] Field of Search .................................... 426/250, 262, 426/441, 637, 438

[56] References Cited

U.S. PATENT DOCUMENTS

| | | |
|---|---|---|
| Re. 27,531 | 12/1972 | Murray . |
| 3,205,074 | 9/1965 | Nack et al. . |
| 3,397,993 | 8/1968 | Strong . |
| 3,424,591 | 1/1969 | Gold . |
| 3,751,268 | 8/1973 | Van Patten et al. . |
| 3,865,964 | 2/1975 | Kellermeier et al. ................... 426/307 |
| 4,276,314 | 6/1981 | Andersen ................ 426/272 |
| 4,542,030 | 9/1985 | Haury et al. ............................ 426/262 |
| 5,484,617 | 1/1996 | Tiffany .................... 426/250 |

*Primary Examiner*—Arthur L. Corbin
*Attorney, Agent, or Firm*—Lerner, David, Littenberg, Krumholz & Mentlik, LLP

[57] ABSTRACT

The present invention relates to a process of preparing frozen potato products. More particularly, the present invention relates to a process for imparting an improved golden-brown color to frozen french fried potato products by passing potato pieces through a solution containing 0.8% to 0.4% by weight of caramel, 0.02% to 0.08% by weight of oleoresin of turmeric, 0.3% to 1.4% by weight of dextrose or any other suitable reducing sugar, and 0.5% to 2.2% by weight of sodium acid pyrophosphate or any suitable effective food grade sequestering agent, then frying and freezing the potato pieces.

13 Claims, No Drawings

PROCESS OF COLORING FRENCH FRY POTATOES

This patent application claims the benefit under Title 35, United States Code, § 119(e) of U.S. Provisional Application No. 60/079,339, filed Mar. 25, 1998.

FIELD OF THE INVENTION

This invention relates to a process for preparing potato products and more particularly to a process for imparting an improved golden-brown highlighted color to a french fry potato product.

BACKGROUND OF THE INVENTION

Various methods have been proposed for imparting a pleasing taste and appearance to french fry potato products and in particular preparing potato products having a rich golden-brown highlighted color. Examples of coloring agents and/or cooking techniques which have been used, include, for example, U.S. Pat. No. 5,484,617, which discloses a process for preparing golden yellow potato pieces by passing the potato pieces through an aqueous solution of the food grade color annatto or yellow dye.

U.S. Pat. No. 4,542,030 also discloses a process for preparing a french fry potato product by immersing the potato strips into the flume or sugar drag containing Sodium Acid Pyrophosphate at a concentration of 0.2% to 0.4% by weight, and caramel at a concentration of 0.5% to 3.5% by weight followed by frying the potato strips in oil for a total maximum time of 40 seconds, preferably at a temperature in the range of 140° F. to 180° F. vegetable oils.

U.S. Pat. No. 3,424,591 discloses a method for coloring a french fry potato product by dipping the partially cooked potato pieces in nonionic alkyl cellulose ether which allegedly inhibits the natural browning.

U.S. Pat. No. RE 27,531 discloses treating potato products by dipping the potato pieces in amylose starch prior to cooking in hot, edible cooking oil. The amylose starch fraction is used as the coating product because it produces improved appearance, texture, and taste when it is used to cut potato products prior to deep-frying.

U.S. Pat. No. 3,751,268 is also directed to the use of a coating containing a high percentage of amylose starch. In this process, the amylose coating is an aqueous solution that may contain a suitable reducing sugar and Sodium Acid Pyrophosphate. The coating takes place before deep-frying and allegedly permits the desired color through a combination of caramel coloring and caramelization of the sugar content.

Unfortunately, many of the previous methods result in potato products that appear too dark and do not have a satisfactory golden-brown highlighted coloring that is desirable for the french fry potato product.

SUMMARY OF THE INVENTION

The present invention relates to an improved process for preparing a potato product in which an improved golden-brown color is obtained by immersing the potato products in a solution containing between about 0.08% and about 0.4% by weight of caramel; between about 0.02% and about 0.8% by weight of oleoresin of turmeric; between about 0.2% and about 2.2% by weight of a food grade sequestering agent; and optionally between about 0.3% and about 1.4% by weight of a suitable reducing sugar.

DETAILED DESCRIPTION OF THE INVENTION

The production of french fry potatoes in accordance with the present invention can generally be carried out using conventional methods for preparing french fry potato products, including, for example, by following the general methods described in U.S. Pat. Nos. 5,484,617 and 4,542,030, the text of which are hereby incorporated by reference. Generally, whole, fresh potatoes are cleaned and sorted by size. The sorted potatoes are then peeled using steam or other conventional methods for removing the peel of the potato, including, for example, by tumbling the potatoes through brushes. Optionally, a "skin-on" french fry product can be prepared by leaving the peel intact. The peeled or "skin-on" potatoes are trimmed to remove all defects and irregularities. The whole potatoes are then preheated, preferably to a core temperature of about 100° F. to 150° F. for approximately ten to forty minutes.

After preheating, the potatoes are cut into a desired size and shape, usually in the form of a strip, crinkle strip or wedge. The size of the strip, crinkle strip, or wedge is preferably approximately ¼ in. to 1 in. wide and ½ in. to 10 in. long. The potatoes are preferably screened for the appropriate size and shape, including the removal of unwanted potato slivers.

The potato strips are then preferably blanched to inactivate the enzymes, gelantize the starch, and to remove excess free sugars which might cause uncontrolled browning. The blanching step consists of partially cooking the potatoes, and may include any suitable method known to one skilled in the art, including using a steam chamber or immersing the potato strips in a water bath. Preferably, the potatoes are partially cooked in a water bath for six to twenty minutes at about 160° F. to 190° F. or until all portions receive enough heat to turn them to a generally translucent condition.

The potatoes are then immersed in the flume or sugar drag to impart both color and flavor to the product. The flume or sugar drag in accordance with the present invention contains between about 0.08% and about 0.35% by weight of caramel, between about 0.02% and about 0.08% by weight of oleoresin of turmeric, and between about 0.2% and about 2.2% by weight of a suitable effective food grade sequestering agent. Optionally, a suitable reducing sugar may also be used in the flume or sugar drag to provide extra flavor and to enhance color. Such sugars are preferably used in an amount of between about 0.3% and about 1.4% by weight, depending on the type of sugar used.

After immersing the potato strips in the flume or sugar drag, the potato strips are then dried for about five to twenty-five minutes at a temperature of about 130° F. to 220° F. After drying, the potato strips are immersion fried for approximately twenty-five to ninety seconds at about 340° F. to 395° F. The preferred fry oil temperature range is about 360° F. to 375° F. The potato strips can then be frozen and packaged for subsequent distribution and use.

Caramel is incorporated into the flume or sugar drag to impart both color and flavor to the potato product. Preferably caramel is included in the flume or sugar drag in an amount between about 0.08% and about 0.4% by weight, and more preferably between about 0.2% and about 0.35% by weight. The amount of caramel should not exceed 0.4% by weight because a caramel concentration above 0.4% by weight results in a product having a color that is too dark and therefore unacceptable. Suitable types of caramel include Ingredient No. 7128 manufactured by UFL of Edmonton, Canada, however, other types of caramel suitable for use in the present invention are generally known to individuals skilled in the art.

A food grade sequestering agent is used in the flume or sugar drag to minimize product discoloration that results from inorganic ions present in the process water. The food grade sequestering agent may be used in the flume or sugar drag. Preferably, the food grade sequestering agent is used at a concentration of between about 0.2% and about 0.4% by weight. The food grade sequestering agent is preferably Sodium Acid Pyrophosphate (SAPP), however, other suitable food grade sequestering agents may also be used, including, for example, disodium ethylene diaminetetraacetate.

Nonlimiting examples of suitable reducing sugars which may be used in the flume or sugar drag include dextrose, glucose, sucrose arabinose, fructose, galactose, mannose, maltose, lactose or cellobiose. It may be more preferable to add a sweet sugar, such as sucrose, to provide an enhanced flavoring effect. Preferably, the reducing sugar is included in the flume or sugar drag in an amount between about 0.3% and about 1.4% by weight.

The temperature of the flume or sugar drag may range from ambient or cold tap water temperatures to about 200° F. The flume or sugar drag is preferably maintained at a temperature of about 140° F. to 180° F. The potatoes are immersed in the flume or sugar drag for a time suitable to obtain the desired color and flavor. Preferably, the potatoes are immersed in the flume or sugar drag for approximately forty to sixty seconds at about 140° F. to 180° F.

The present invention is particularly directed to producing potato products that have an improved golden-brown highlighted color and color intensity. The improved color and color intensity can be verified by visual inspection or by the use of devices and techniques known to one skilled in the art for measuring color and color intensity, including, for example, a spectrophotometer which may be used to define the reflective colorimeter values vs. the concentration of the ingredients in the flume or sugar drag, and in particular the concentration of caramel.

While preferred ingredients and process steps have been disclosed to facilitate an understanding of the invention, it will be appreciated by one skilled in the art that functional equivalents can be substituted or additional steps added without departing from the scope of the present invention. Accordingly, the presently disclosed embodiments are considered illustrative and not restrictive.

EXAMPLE

SORT POTATOES BY SIZE
|
PEEL THE POTATOES
|
TRIM AND REMOVE DEFECTS
|
PREHEAT TO A CORE TEMPERATURE OF
100° F. TO 150° F.
|

-continued

CUT INTO DESIRED SIZE AND SHAPE
|
BLANCH FOR SIX TO TWENTY SIX MINUTES
AT 160° F. TO 190° F.
|
FLUME FOR 40 TO 60 SECONDS AT 140° F.
TO 180° F.
|
THE FLUME CONTAINS CARAMEL (0.08% TO
0.35%); OLEORESIN OF TURMERIC (0.02% TO
0.08%); DEXTROSE (0.3% TO 1.4%); AND
SODIUM ACID PYROPHOSPHATE (0.5%
TO 2.2%)
|
DRY FOR FIVE TO TWENTY-FIVE MINUTES AT
130° F. TO 220° F.
|
FRY FOR TWENTY-FIVE TO NINETY SECONDS
AT 340° F. TO 395° F.
|
FREEZE
|
PACKAGE

We claim:

1. A process for preparing a frozen french fry potato product having a golden-brown highlighted appearance, comprising:
   a) optionally peeling potatoes;
   b) cutting or shaping said potatoes into pieces of desired shape and size; and
   c) immersing said potatoes in a solution containing between about 0.08% and about 0.4% by weight of caramel; between about 0.02% and about 0.08% by weight of oleoresin of turmeric; and between about 0.5% and about 2.2% by weight of a suitable food grade sequestering agent.

2. The process of claim 1 wherein said solution further includes 0.3% to 1.4% by weight of a suitable reducing sugar.

3. The process of claim 2 wherein said reducing sugar comprises dextrose.

4. The process of claim 2 wherein said reducing sugar comprises glucose.

5. The process of claim 4 further comprising the steps of drying said immersed potato pieces, frying said dried potato pieces, and freezing said fried potato pieces.

6. The process of claim 2 wherein said reducing sugar comprises sucrose arabinose.

7. The process of claim 1 wherein said food grade sequestering agent comprises sodium acid pyrophosphate.

8. The process of claim 1 wherein said caramel is included in amount of between about 0.2% and about 0.35 wt. %.

9. The process of claim 1 wherein said food grade sequestering agent comprises disodium diaminetetraacetate.

10. The process of claim 1 further comprising the step of first preheating said potatoes.

11. The process of claim 1 further comprising the step of blanching said potatoes by partially cooking said potato pieces by immersing said potato pieces in a water bath.

12. The process of claim 11 wherein said potato pieces are partially cooked in said water bath for six to twenty minutes at of about 160° F. to 190° F.

13. A french fry potato product comprising potato pieces which have been optionally peeled, then cut or shaped, and then immersed in a flume or sugar drag containing between about 0.08% and about 0.4% by weight of caramel; between about 0.02% and about 0.08% by weight of oleoresin of turmeric; and between about 0.5% and about 2.2% by weight of a suitable food grade sequestering agent.

* * * * *

UNITED STATES PATENT AND TRADEMARK OFFICE
CERTIFICATE OF CORRECTION

PATENT NO. : 6,113,957
DATED : Sept. 5, 2000
INVENTOR(S) : Mattinson et al.

It is certified that error appears in the above-identified patent and that said Letters Patent is hereby corrected as shown below:

On the Cover Page at [57] ABSTRACT, delete "0.8%" and insert therefor --0.08%--.
Column 2, line 4, delete "text" and insert therefor --texts--.
Column 4, line 3, delete "twenty six" and insert therefor --twenty-six--.
Column 4, line 58, delete "of".

Signed and Sealed this

First Day of May, 2001

*Attest:*

NICHOLAS P. GODICI

*Attesting Officer*   *Acting Director of the United States Patent and Trademark Office*